No. 636,152. Patented Oct. 31, 1899.
A. H. LOHSE.
GARMENT FASTENER.
(Application filed May 13, 1899.)
(No Model.)
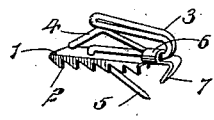
Fig. 1.
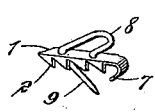
Fig. 5.
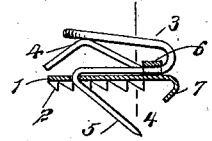
Fig. 2.
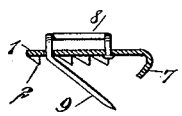
Fig. 6.
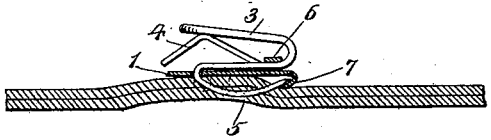
Fig. 3.
Fig. 4.
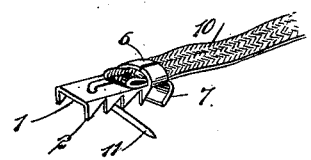
Fig. 7.
WITNESSES:
William P. Gaebel
C. R. Ferguson
INVENTOR
Arthur H. Lohse
BY
ATTORNEYS.

UNITED STATES PATENT OFFICE.

ARTHUR H. LOHSE, OF NEW YORK, N. Y.

GARMENT-FASTENER.

SPECIFICATION forming part of Letters Patent No. 636,152, dated October 31, 1899.

Application filed May 13, 1899. Serial No. 716,709. (No model.)

*To all whom it may concern:*

Be it known that I, ARTHUR H. LOHSE, of the city of New York, borough of Manhattan, in the county of New York and State of New York, have invented a new and Improved Garment-Fastener, of which the following is a full, clear, and exact description.

This invention relates to improvements in fastening devices for garments; and the object is to provide a simple means for securing the fastening device to a garment without the use of thread, thus making it practically easy for any one to attach the fastener; and a further object is to so construct the parts that the fastener will be prevented from turning laterally.

I will describe a garment-fastener embodying my invention and then point out the novel features in the appended claims.

Reference is to be had to the accompanying drawings, forming a part of this specification, in which similar characters of reference indicate corresponding parts in all the figures.

Figure 1 is a perspective view of a fastening device in the form of a hook embodying my invention. Fig. 2 is a partial side elevation and partial section of the device shown in Fig. 1. Fig. 3 shows the device as applied to a garment. Fig. 4 is a section on the line 4 4 of Fig. 2. Fig. 5 is a perspective view of the fastening made in the form of an eye. Fig. 6 is a partial elevation and partial section thereof, and Fig. 7 shows a portion of a garment-suspending strap embodying my invention.

The fastening device comprises an anchoring-plate 1, of any suitable material—such, for instance, as metal. At its opposite sides this anchoring-plate 1 has downwardly-extended teeth 2, designed to engage in the material to which the fastening device is attached and prevent any lateral or swinging motion of the fastening device.

In Fig. 1 I have shown a hook 3 as secured to the anchoring-plate 1. This hook consists of a single length of wire having one of its ends 4 extended upward nearly to the under side of the end of the hook, so as to prevent an accidental detachment of the hook from an eye. As this portion 4 is resilient, it may be easily pressed downward when passing the hook into or out of an eye. The opposite end of the wire from which the hook is formed is passed through a hole in the anchoring-plate 1 and is sharpened at the point to form a pin 5. The hook is held on the plate 2 by means of a clip 6, formed on the plate and bent over the portions of the hook, as clearly indicated in the drawings. In attaching the fastening device to a garment the pin 5 is to be passed through the material, and then a keeper-plate 7, formed on the plate 1, is to be pressed against the point of the pin, as indicated in Fig. 3.

The fastening device shown in Fig. 5 consists of an eye 8, formed of a single length of wire and having one end attached to the anchoring-plate 1 and the other end passed through an opening in said plate and provided with a pin-point 9. This is to be secured to the garment in the same manner as the device shown in Fig. 1 is secured. In Fig. 7 clips 6 are turned over the end of a flexible strap 10, and in this example a pin-point 11 extends through an opening in the plate and is adapted to be engaged by the keeper-plate 7, as before described.

While the device shown in Fig. 7 is not a garment-fastener in the sense of the other fasteners shown, it may be considered a fastening device, inasmuch as it is a means for attaching a garment to a hook or other support.

Having thus fully described my invention, I claim as new and desire to secure by Letters Patent—

1. In a garment-fastener, an anchoring-plate having teeth at its sides extended at an angle to the body of the plate, a pin mounted on the plate, a keeper-plate on one end of the anchoring-plate and adapted to engage with the pin, and a fastening device on the anchoring-plate, substantially as specified.

2. A garment-fastener, comprising a plate having teeth at its sides, the said teeth being extended at an angle to the body of the plate, a fastening device consisting of a single length of wire attached to the plate and having one end extended through an opening in the plate to form a pin, and a keeper on the plate for engaging with the pin, substantially as specified.

3. A garment-fastener, comprising a plate, a hook consisting of a single length of wire having one of its ends extended nearly to the end of the hook and having its other end extended through an opening in the plate to form a pin, and a keeper on the plate for engaging with said pin, substantially as specified.

ARTHUR H. LOHSE.

Witnesses:
JNO. M. RITTER,
C. R. FERGUSON.